United States Patent [19]

Takemori et al.

[11] Patent Number: 5,453,288
[45] Date of Patent: Sep. 26, 1995

[54] PROCESS OF PREPARING MINERAL-ENRICHED CACAO-NIBS

[76] Inventors: Toshio Takemori; Toshinobu Tsurumi; Masanori Ito; Tatsuya Kamiwaki, all of c/o Lotte Corporation 20-1, Nishishinjyuku 3-chome, Shinjyuku-ku, Tokyo, Japan

[21] Appl. No.: 103,560

[22] Filed: Aug. 9, 1993

[30] Foreign Application Priority Data

Aug. 12, 1992 [JP] Japan ................................ 4-215011

[51] Int. Cl.⁶ .................................................. A23G 1/00
[52] U.S. Cl. ...................... 426/631; 426/442; 426/466; 426/482
[58] Field of Search ..................... 426/74, 631, 442, 426/459, 466, 506, 482, 483, 520

[56] References Cited

U.S. PATENT DOCUMENTS

| | | | |
|---|---|---|---|
| 3,904,777 | 9/1975 | Goerling et al. | 426/631 |
| 4,216,237 | 8/1980 | Smith | 426/631 |
| 4,871,562 | 10/1989 | Terauchi et al. | 426/631 |
| 4,882,181 | 11/1989 | Giddey et al. | 426/74 |

FOREIGN PATENT DOCUMENTS

| | | | |
|---|---|---|---|
| 2-215347 | 8/1990 | Japan | 426/631 |
| 4-158744 | 6/1992 | Japan | 426/74 |

*Primary Examiner*—Anthony J. Weier

[57] ABSTRACT

A process of preparing mineral-enriched cacao-nibs for improving the utilization of mineral, by adding an aqueous solution containing at least one mineral to cacao-nibs obtained by treating raw or semi-roasted cacao beans with a winnower to remove shells and germs, reacting the cacao-nibs with the added mineral under heat and pressure conditions, followed by drying and roasting the resulting cacao-nibs.

2 Claims, 2 Drawing Sheets

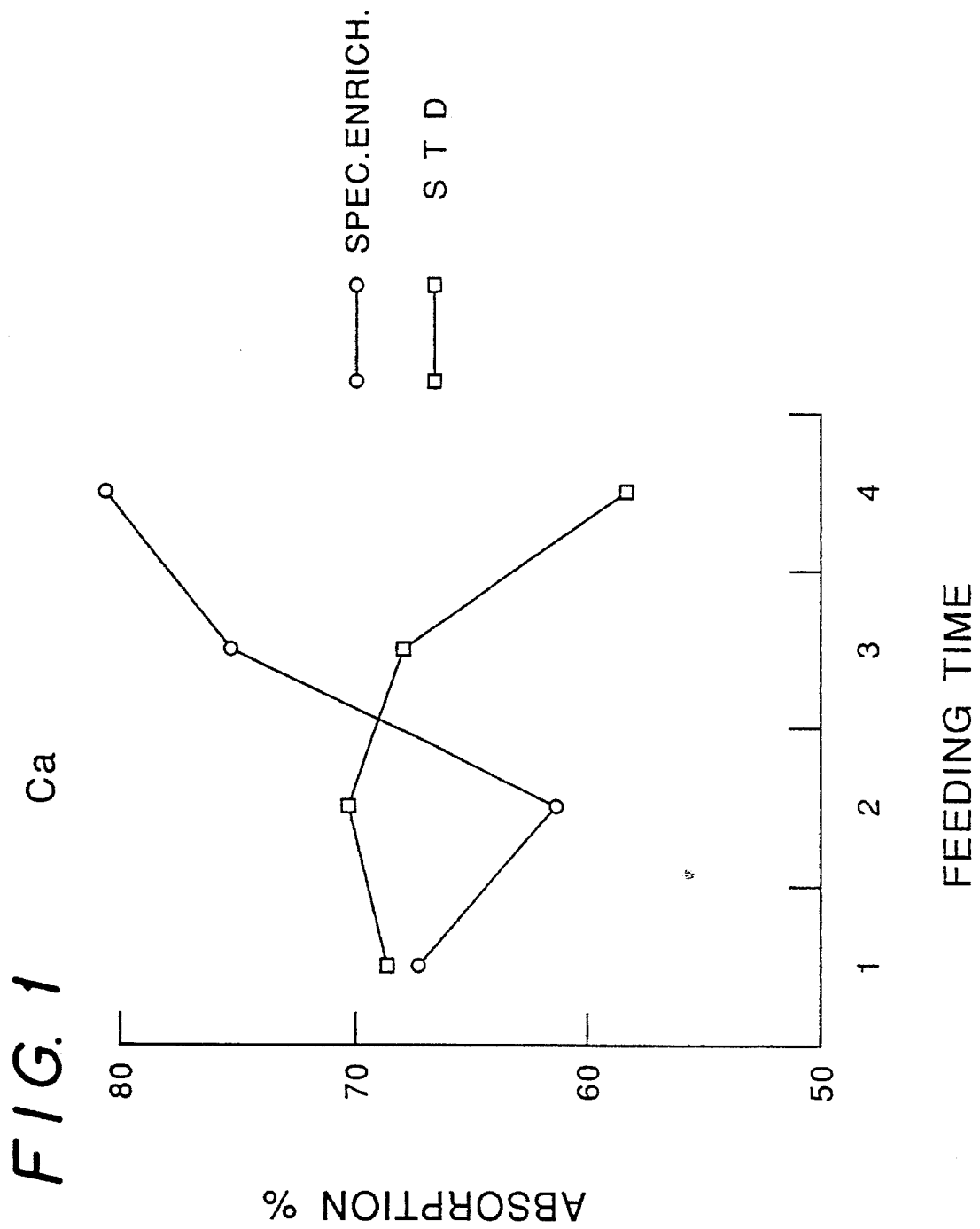

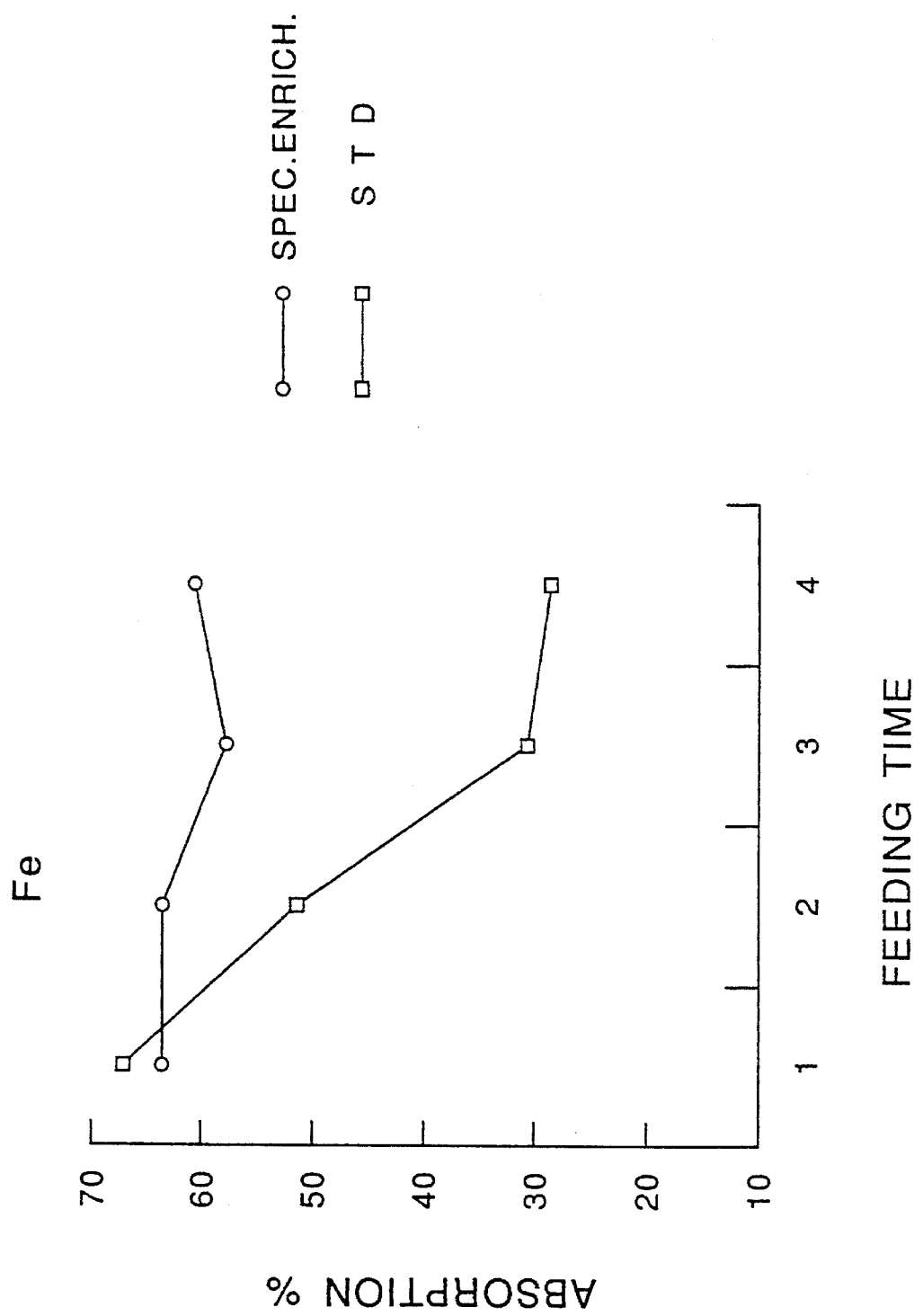

PROCESS OF PREPARING MINERAL-ENRICHED CACAO-NIBS

BACKGROUND OF THE INVENTION

1. Field of the Invention

This invention relates to a process of preparing mineral-enriched cacao-nibs by adding minerals to raw cacao beans for chocolate or cocoa under certain conditions intended to improve the utilization of mineral in the body. Further, it relates to a process of preparing chocolate products (including chocolate confectionary) and cocoa products (including for example, cocoa drinks) by use of the mineral-enriched cacao-nibs.

2. Description of the Prior Art

Prior processes of enriching chocolate, for example, with a mineral in the art have been directed mainly to calcium as a mineral. Among the prior processes, there may be mentioned a method of mixing and dispersing calcium or calcium salt in chocolate (Japanese Laid-open Application 34-143557), as well as a method of adding to chocolate a powder of calcium salt prepared by dispersing calcium as finely divided particles in a liquid followed by drying (Japanese Patent Publication 34-9984), but such methods are merely directed to a mixing and dispersing operation of chocolate with calcium. Further, the form of calcium in the prior art has not necessarily been absorbed well in the body, resulting in disregard of the utilization of calcium.

As described in the above, although addition of the mineral to, for example, chocolate for enrichment is well known in the art, the conventional methods relate merely to dispersion of the mineral (for example, calcium) into chocolate, namely to separate ingestion of the chocolate from the mineral. Further, the mineral can perform its function only after absorption into the body, but its inorganic form is presumed to have limitation in its absorption.

SUMMARY OF THE INVENTION

Accordingly it is an object of the invention to improve the utilization of mineral in the body by enriching the cacao-nibs (namely, a raw material for chocolate and cocoa) with the mineral under certain conditions.

It is another object of the invention to provide a process of preparing mineral-enriched cacao-nibs.

It is a further object of the invention to provide a process of preparing chocolate products (including chocolate confectionary) and cocoa products (including cocoa drinks) based on the enriched cocoa-nibs.

The above and other objects, features and advantages of the present invention will be apparent from the following description.

The present invention provides a process of preparing mineral-enriched cacao-nibs for improving the utilization of mineral, which comprises adding an aqueous solution containing at least one mineral to cacao-nibs obtained by treating raw or semi-roasted cacao beans with a winnower to remove shells and germs, reacting the cacao-nibs with the added mineral under heating and pressure conditions, followed by drying and roasting the resulting cacao-nibs.

BRIEF DESCRIPTION OF THE DRAWINGS

Preferred embodiments of the present invention will hereinafter be fully described in detail with reference to the accompanying drawings.

FIG. 1 is a diagram showing a graph of experimental results of the mineral absorption through mineral (calcium)-enriched cacao mass.

FIG. 2 is a diagram showing a graph of experimental results of the mineral absorption through mineral (iron)-enriched cacao mass.

PREFERRED EMBODIMENTS OF THE INVENTION

The present process is not limited to a specified type of cacao beans, a size of beans and a state of beans (a degree of fermentation, a water content etc.) but any raw beans for usual chocolate and cocoa may be employed.

Preferably, a mineral itself or a mineral salt may be used as the mineral material. As the mineral there may be mentioned mainly calcium and iron, however any edible minerals such as magnesium, zinc and copper may be included.

Calcium and magnesium are very similar in ionic property and may be sufficiently expected to have substantially the same effect, while zinc and copper are likely to have a similar effect. A monovalent cation such as sodium and potassium, however, is not expected to have such effect.

The amount of cacao-enriching mineral added is preferably in the range from 0.001 to 10.0% by weight relative to the cacao-nibs. The amount should be determined, however, depending on a nature of the mineral and a possible amount for food. On the other hand, an optional dispensable mineral such as zinc and copper, which is usually sufficiently present in the food, may be omitted except for special applications.

The reaction may be carried out under heating and pressure condition of a temperature from 40° to 150° C. and a pressure from 1 to 5 atm for 2 to 5 minutes. The purpose of the invention may be achieved by either heating or applying pressure, but preferably both may be employed. However, a temperature above 40° C. is required for the reaction. A higher temperature is set with difficulty because of variation of the reaction depending on the duration of reaction, the water content of the cacao-nibs and the pressure condition. For example, an extended period of reaction at more than 130° C. in an anhydrous state causes the cacao-nibs to begin scorching and burning. In a hydrous state, however, such deteriorating effect could be eliminated. A normal pressure may be employed, but a pressure from the normal to 5.0 atm is preferable in order to enhance the reactivity. Suitably, the vapour pressure may be employed for enhancing the reactivity of the mineral with the cacao-nibs. In accordance with another aspect of the present invention, there is provided a process of preparing mineral-enriched chocolate products intended for improving the utilization of mineral, which comprises adding an aqueous solution containing at least one mineral to cacao-nibs obtained by treating raw or semi-roasted cacao beans with a winnower to remove shells and germs, reacting the cacao-nibs with the added mineral under the heating and pressure condition, followed by drying and roasting the resulting cacao-nibs to give mineral-enriched cacao-nibs, with are then milled and ground to form a cacao liquor for preparing the chocolate products.

In accordance with a further aspect of the invention, there is provided a process of preparing mineral-enriched cocoa products intended for improving the utilization of mineral, which comprises adding an aqueous solution containing at least one mineral to cacao-nibs obtained by treating raw or semi-roasted cacao beans with a winnower to remove shells and germs, reacting the cacao-nibs with the added mineral under the heating and pressure condition, followed by drying and roasting the resulting cacao-nibs to give mineral-enriched cacao-nibs, which are then ground, oil-expressed, coarsely ground and pulverized to form a cocoa powder for preparing the cocoa products.

As described in the foregoing, the mineral-enrichment by adding the minerals to, for example, chocolate is well known in the art. In such prior art, however, the mineral (for example, calcium) is simply dispersed in the chocolate, resulting in separate uptake of the mineral from the chocolate.

Further, the mineral can perform its function only after absorption into the body, but its inorganic form is presumed to have limitation in its absorption.

The present invention has succeeded in enhancing the utilization of mineral in the body by positively reacting the mineral with the cacao. In the mineral-enriched cacao-nibs, the chocolate products and the cocoa products, the mineral is not in the simple inorganic form but seems to be in the complex form, thereby improving the utilization of mineral.

In the conventional products simply added with the mineral, the latter is not activated (namely, not in the readily absorbable form) resulting in the low absorption, and thus addition of a larger amount of the mineral is required for compensation. As apparent from Examples described hereinafter, the mineral-enriched and -activated chocolate or cocoa products according to the invention could provide much higher utilization of mineral than the conventional products simply added with the mineral.

According to the invention, the utilization of mineral in the body may be improved significantly by enriching the cacao beans (raw material for chocolate and cocoa) with the mineral under the certain condition. For this purpose, the cacao is reacted with the mineral under the given conditions to produce the mineral-enriched cacao-nibs, which may be further processed to produce the mineral-enriched chocolate and cocoa products. Such chocolate and cocoa products are expected to have various physiological effects such as protection of irritation, improved resistance to mental stress, anti-anemia, as well as strengthening of bones and teeth.

The invention will now be illustrated by the following examples with reference to the accompanying drawings.

EXAMPLES

Example 1 (Preparation of mineral-enriched cacao-nibs)

5% of calcium carbonate and 0.5% of iron citrate were added to the cacao-nibs at 130° C. under a pressure of 1 atm for 20 minutes and stirred. After the reaction, the mixture was dried and roasted to give mineral-enriched cacao-nibs.

Test A (Determination of the result through animal experiment)

In order to evaluate the mineral utilization in vivo, the following experiment of mineral balance in rat was carried out, using the mineral-enriched cacao-nibs prepared by the present process.

A Wistar male rat of initial body weight of 70 g was employed as a test animal. The test was continued for one month, while the mineral balance was observed with time. Composition of a sample used for the calcium-enrichment test (Test 1) is shown in Table 1 below, while that for the iron-enrichment test (Test 2) is shown in Table 2. A symbol STD represents the enrichment through conventional standard blending, while the wordings "Specific Ca-enrichment" and "Specific Fe-enrichment" represent the Ca- and Fe-enrichment of the cacao mass according to the invention, respectively.

TABLE 1

| Composition of Sample | S T D | Specific Ca-enrichment |
|---|---|---|
| Milk Casein | 20 | 20 |
| Mineral Mixture | 3.6 | 2.4 (without Ca) |
| Vitamin Mixture | 1 | 1 |
| Corn Starch | 57.4 | 58.6 |
| Cacao Mass | 20 | — |
| Ca-enriched Cacao Mass | — | 20 |

TABLE 2

| Composition of Sample | S T D | Specific Fe-enrichment |
|---|---|---|
| Milk Casein | 20 | 20 |
| Cocoa Butter | 10 | 10 |
| Mineral Mixture | 3.6 | 3.6 (without Fe) |
| Vitamin Mixture | 1 | 1 |
| Corn Starch | 57.4 | 57.4 |
| Cacao Mass | 20 | — |
| Fe-enriched Cacao Mass | — | 20 |

The experimental result of the calcium-enrichment is shown in FIG. 1, while that of the iron-enrichment is shown in FIG. 2. It will be appreciated from these Figures that the utilization of calcium and iron is higher in the enrichment according to the invention than in the conventional one wherein Ca and/or Fe is simply added to the cacao mass powder.

In the experiment of the mineral balance in rat, a quantity of mineral uptake was calculated from that of feed uptake with a quantity of the mineral in urine and feces being calculated as an excreted amount. Analysis of the minerals was conducted by atomic-absorption spectroscopy. It will be presumed that the amount of calcium retained in the body has been deposited on the bone.

Example 2 (Preparation of mineral-enriched chocolate)

The cacao mass obtained by grinding the mineral-enriched cacao-nibs of Example 1 was well mixed with sugar, whole milk powder and a portion of cocoa butter, and then the mixture was milled. Thereafter, an additional portion of cocoa butter, an emulsifying agent and a flavor were added to the resulting material, which was then further processed to produce a raw chocolate material. The raw material was then shaped into a chocolate product. The product was not organoleptically different from the conventional chocolate.

Test B (Determination of the result through animal experiment)

The chocolate product from Example 2 was used for determining the result of the invention. An experiment was carried out, using a 4 week old male SD-rat. A feed contained 50% of the chocolate of Example 2 with the balance being casein, starch, mineral mixture (without Ca and Fe), vitamin mixture and choline chloride (Specific Enrichment Series). As a control, a conventional chocolate was used which had been adjusted with calcium carbonate and iron citrate to the same Ca- and Fe-level. The result of the absorption was as follows.

|  | Calcium | Iron |
| --- | --- | --- |
| Control | 58.5% | 40.3% |
| Specific Enrich. Series | 78.5% | 64.3% |

Example 3 (Preparation of mineral-enriched cocoa powder)

To cacao-nibs were added 2.5% of calcium hydroxide, 2.5% of potassium carbonate and 0.5% of iron citrate at 130° C. under a pressure of 1 atm for 10 minutes, and the mixture was stirred. After the reaction, the material was dried and roasted to provide mineral-enriched cacao-nibs, which were then ground, oil-expressed, crushed and pulverized to form a mineral-enriched cocoa powder.

Example 4 (Preparation of mineral-enriched instant cocoa)

To the cocoa powder of Example 3 were added sugar, whole milk powder, skimmed milk powder, salt, flavor and an emulsifying agent and mixed to form a mineral-enriched instant cocoa. This instant cocoa product was not different in its dispersibility and organoleptically from the conventional one.

Test C (Determination of the result through animal experiment)

The instant cocoa product from Example 4 was used for determining the result of the invention. An experiment was carried out, using a 4-week old male SD-rat. A feed contained 40% of the instant cocoa of Example 4 with the balance being casein, starch, mineral mixture (without Ca and Fe), vitamin mixture and choline chloride (Specific Enrichment Series). As a control, a conventional instant cocoa was used which has been adjusted with calcium carbonate and iron citrate to the same Ca- and Fe-level. The result of the absorption was as follows.

|  | Calcium | Iron |
| --- | --- | --- |
| Control | 57.4% | 42.6% |
| Specific Enrich. Series | 76.8% | 64.5% |

Example 5 (Preparation of calcium-enriched cacao mass)

5% of calcium carbonate was added to cacao-nibs and the mixture was stirred while introducing a steam for 5 minutes in an open system and for 10 minutes in a closed system (130° C. and 1 atm). After the reaction, the material was dried, roasted and groung to provide a calcium-enriched cacao mass.

Example 6 (Preparation of calcium-enriched chocolate)

The calcium-enriched cacao mass of Example 5 was well mixed with sugar, whole milk powder and a portion of cocoa butter, and then the mixture was milled. Thereafter, an additional portion of cocoa butter, an emulsifying agent and a flavor were added to the resulting material, which was then further processed to produce a raw chocolate material. The raw material was then shaped into a chocolate product. The product was not organoleptically different from the conventional chocolate.

The cacao mass obtained by grinding the mineral-enriched cacao-nibs of Example 1 was well mixed with sugar, whole milk powder and a portion of cocoa butter, and then the mixture was milled. Thereafter, an additional portion of cocoa butter, an emulsifying agent and a flavor were added to the resulting material, which was then further processed to produce a raw chocolate material. The raw material was then shaped into a chocolate product. The product was not organoleptically different from the conventional chocolate.

Test D (Determination of the result through animal experiment)

The chocolate product from Example 6 was used for determining the result of the invention. An experiment was carried out, using a male SD-rat of 4-week old. A feed contained 50% of the chocolate from Example 6 with the balance being casein, starch, mineral mixture (without Ca), vitamin mixture and choline choloride (Specific Enrichment Series). As a control, a conventional chocolate was used which had been adjusted with calcium carbonate to the same Ca-level. The result of the absorption was as follows.

|  | Calcium |
| --- | --- |
| Control | 56.8% |
| Specific Enrich. Series | 79.5% |

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover by claims all modifications of the invention which fall within the spirit and scope of the invention.

What is claimed is:

1. A process of preparing mineral-enriched cacao-nibs, which comprises: adding an aqueous solution containing an enriching mineral to cacao-nibs obtained by treating raw or semi-roasted cacao beans with a winnower to remove shells and germs, said enriching mineral being present in an amount sufficient to increase absorption of the mineral in a body and thereby improve utilization of the mineral in the body, said enriching mineral being selected from the group consisting of calcium, iron, zinc and copper; reacting the cacao-nibs with the added mineral under a temperature ranging from 40° to 150° C. and a pressure ranging from 1 to 5 atmospheres; and drying and roasting the reacted cacao-nibs.

2. The process as recited in claim 1, wherein the amount of the enriching mineral ranges from 0.001 to 10.0% by weight based on the cacao-nibs.

* * * * *

UNITED STATES PATENT AND TRADEMARK OFFICE
CERTIFICATE OF CORRECTION

PATENT NO.   : 5,453,288
DATED        : September 26, 1995
INVENTOR(S)  : Toshio TAKEMORI et al.

It is certified that error appears in the above-indentified patent and that said Letters Patent is hereby corrected as shown below:

On the title page of the patent, insert Item 73 as follows:

--[73]  Assignee:  Lotte Corporation, Tokyo, Japan--.

Signed and Sealed this

Twenty-fourth Day of December, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,453,288
DATED : September 26, 1995
INVENTOR(S) : Toshio TAKEMORI et al.

It is certified that error appears in the above-indentified patent and that said Letters Patent is hereby corrected as shown below:

On the title page, in Item 73, change "Lotte Corporation" to --Lotte Co., Ltd.--.

Signed and Sealed this

Twenty-first Day of October 1997

Attest:

BRUCE LEHMAN

Attesting Officer

Commissioner of Patents and Trademarks